United States Patent
Anderson et al.

(10) Patent No.: US 6,212,203 B1
(45) Date of Patent: Apr. 3, 2001

(54) METHODS, SYSTEMS AND COMPUTER PROGRAM PRODUCTS FOR MESSAGE PROCESSING IN LOST DATA CIRCUMSTANCES IN WIRELESS COMMUNICATIONS

(75) Inventors: Keith William Anderson, Durham; Brian Alan Burdette, Apex, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/032,192

(22) Filed: Feb. 27, 1998

(51) Int. Cl.$^7$ ........................................... H04J 3/16
(52) U.S. Cl. .................. 370/473; 370/216; 370/241; 370/332; 371/30; 455/466
(58) Field of Search ..................... 370/216, 241, 370/242, 243, 244, 245, 246, 332, 410, 428, 473, 394; 371/30, 35, 37.7; 455/466

(56) References Cited

U.S. PATENT DOCUMENTS

| | | | | |
|---|---|---|---|---|
| 3,754,211 | * | 8/1973 | Rocher et al. | 370/410 |
| 4,718,066 | * | 1/1988 | Rogard | 371/35 |
| 5,617,541 | * | 4/1997 | Albanese et al. | 395/200.13 |
| 5,903,840 | * | 5/1999 | Bertacchi | 370/332 |

\* cited by examiner

*Primary Examiner*—Douglas Olms
*Assistant Examiner*—Shick Hom
(74) *Attorney, Agent, or Firm*—Myers Bigel Sibley & Sajovec

(57) ABSTRACT

Methods, systems and computer program products are provided which improve message processing in lost data circumstances for a communication system communicating over a wireless communication link by receiving part of a message which has been transmitted over the wireless communication link and determining if sufficient information was received in the message to perform an operation specified by the message. The operation is performed if it is determined that sufficient information was received in the message to perform the specified operation.

12 Claims, 5 Drawing Sheets

| Header A<br>(7 bits) | Header B<br>(7 bits) | EHI<br>(1 bit) | MSID<br>(34 bits) | L3LI<br>(8 bits) | L3 Data<br>(52 bits) |
|---|---|---|---|---|---|

Figure 6A

| Header A<br>(7 bits) | Header B<br>(7 bits) | L3 Data<br>(12 bits) | Filler<br>(83 bits) |
|---|---|---|---|

Figure 6B

| Protocol<br>Discriminator<br>(2 bits) | Message<br>Type<br>(6 bits) | Service<br>Code<br>(4 bits) | Display<br>(40 of expected 52 bits) |
|---|---|---|---|

Figure 6C

METHODS, SYSTEMS AND COMPUTER PROGRAM PRODUCTS FOR MESSAGE PROCESSING IN LOST DATA CIRCUMSTANCES IN WIRELESS COMMUNICATIONS

FIELD OF THE INVENTION

The present invention relates to wireless communications. In particular the present invention relates to the processing of messages received from wireless communication links.

BACKGROUND OF THE INVENTION

Public cellular networks (public land mobile networks) are commonly employed to provide voice and data communications to a plurality of subscribers. For example, analog cellular radiotelephone systems, such as designated AMPS, ETACS, NMT-450, and NMT-900, have been deployed successfully throughout the world. More recently, digital cellular radiotelephone systems such as designated IS-54B and IS-136 in North America and the pan-European GSM system have been introduced. Several systems for providing wireless voice and data communications are described, for example, in the book titled *Cellular Radio Systems* by Balston, et al., published by Artech House, Norwood, Mass., 1993. In addition, satellite based radio communication systems are also being utilized to provide wireless communications in various regions such as the Asian Cellular Satellite System (ACeS).

Typically, modern cellular systems use communication protocols which receive messages as frames which either singly or in combination contain a message. An example of one such communication protocol used in modern wireless communication systems is the IS-136 standard. IS-136 is the TDMA (Time Division Multiple Access) Digital Analog Mobile Phone System Cellular (D-AMPS) specification. One feature introduced with IS-136 is a layered protocol for the digital control channel. These three layers are illustrated in FIG. 1 and include the Physical Layer (L1), the Data Link Layer (L2) and the Call Processing Layer (L3).

The Physical Layer (L1) provides access to the wireless communication media which is a 4,860 bits/second π/4 Differential Quadrature Phase Shift Keying (DQPSK) channel. The Physical Layer includes a physical channel that is divided into 40 ms frames, each of which is sub-divided into 6 slots. Data is convolutionally encoded which allows for 125 bits of Layer 2 data per slot of the physical channel if the CRC, L3 Data and L2 header are included.

The Data Link Layer (L2) monitors and controls reverse accesses, decodes L2 messages and buffers the resultant L3 data, filters messages not destined for the mobile station and controls the mobile low power duration. L2 resolves messages into either an Fast Broadcast Control Channel (FBCCH), an Extended Broadcast Control Channel (EBCCH), or a SMS,PCH and ARCH Channel (SPACH) message. FBCCH and EBCCH messages are broadcast messages which are intended for all mobile stations. SPACH messages are addressed to a specific mobile station, for example, incoming calls are SPACH messages. SPACH messages are further divided into Paging Channel (PCH) messages which are used for initially notifying a mobile station of an event, Short Message Service Channel (SMSCH) messages which are used for transmission of short messages, or Access Response Channel (ARCH) messages which are used for conveying responses to the mobile station after the mobile station has transmitted a message.

The Call Processing Layer (L3) is a state machine which defines the state of the mobile station. The mobile station waits for incoming notices by "camping" on a control channel. The mobile station leaves the camping state to handle an incoming PCH message, to handle an origination attempt, to register, or to send a short text message, etc.

As is briefly described above, an IS-136 system receives frames which are decoded by L2 which also buffers the L3 data of a message. Thus, L2 assembles messages from the frames and passes the messages to L3. L3 then carries out the operations specified by the messages received from L2. One difficulty with such a system may arise where fewer than all of the frames of a message are received by L2 such that a complete message cannot be assembled and forwarded to L3 (i.e., some L3 data is lost). Currently, systems known to the inventors discard these incomplete messages either at L2 or L3. Thus, the loss of a message, which may span multiple frames, may result from the loss of a single frame. In transmission environments where the loss of frames is common, this loss of messages typically reduces the efficiency of communication.

In light of the above discussion, a need exists for improvements in the processing of messages from frames received in a wireless communication system so as to reduce the likelihood that messages will be lost.

SUMMARY OF THE INVENTION

In view of the above discussion, it is an object of the present invention to provide improved processing of messages in a lost data circumstance.

Another object of the present invention is to reduce the number of discarded messages resulting from a loss or error condition associated with a frame.

Still another object of the present invention is to provide improved processing of messages transmitted in a lost data circumstance in a manner which is compatible with existing wireless communication protocols.

These and other objects of the present invention are provided by methods, systems and computer program products which improve message processing in lost data circumstances for a communication system communicating over a wireless communication link by receiving part of a message which has been transmitted over the wireless communication link and determining if sufficient information was received in the message to perform an operation specified by the message. The operation is performed if it is determined that sufficient information was received in the message to perform the specified operation.

By evaluating partially received messages, the present invention allows for the recovery of messages from transmissions which would otherwise have been discarded, thereby, reducing the number of discarded messages. Thus, the present invention improves the ability of a station to recover messages in lost data circumstances as long as enough of the message is received to perform at least one operation specified by the message.

In a further embodiment of the present invention, the communication system operates utilizing a layered communication protocol. In such a case, a first layer of the layered communication protocol receives frames of a message and provides, to a second layer of the layered communication protocol, a partial message if the entire message is not received by the first layer. Information about how much and what portions of the message are missing may also be supplied. The partial message received by the first layer is received by a second layer of the communication protocol which determines if sufficient information is included in the partial message to perform an operation specified by the message. The partial message may be provided to the second layer if an error in receiving a frame of the message occurs or upon occurrence of a timeout condition associated with the message.

In a particular embodiment, a partial message may be assembled from the frames received by the first layer if all of the frames of a message are not received by the first layer and the assembled partial message provided to the second layer.

Another embodiment of the present invention provides improved message processing in lost data circumstances for a radiotelephone communicating over a wireless communication link utilizing a communication protocol having messages which contain both mandatory elements and optional elements. In such an embodiment, frames of a message having both mandatory and optional elements are received from the wireless communication link. It is then determined if all of the frames associated with a message received from the wireless communication link are less than all of the frames specified for the message. A partial message corresponding to the frames received from the wireless communication link is then assembled if the frames received from the wireless communication link are less than all of the frames specified for the message. It is then determined if the mandatory elements of the message are present in the partial message. The specified operation of the message is then performed if the mandatory elements of the message are present in the partial message.

In a further embodiment of the present invention, the determination whether all of the frames of a message received from a wireless communication link are less than all of the frames specified for the message is carried out by determining if a received frame is a begin frame of a message of the same type as a message which has been previously started. This determination may also be made by determining if an error condition has occurred relating to a frame of the message. It may also be determined that less than all the specified frames of a message are received if a timeout has occurred while waiting for a frame of the message.

In a specific embodiment of the present invention, the communication protocol comprises IS-136.

As will further be appreciated by those of skill in the art, the present invention may be embodied as a method, apparatus/system or computer program product.

BRIEF DESCRIPTION OF THE DRAWINGS

FIGS. 6A through 6C are diagrams illustrating one example of the assembly of a partial message according to the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

Figure 1:
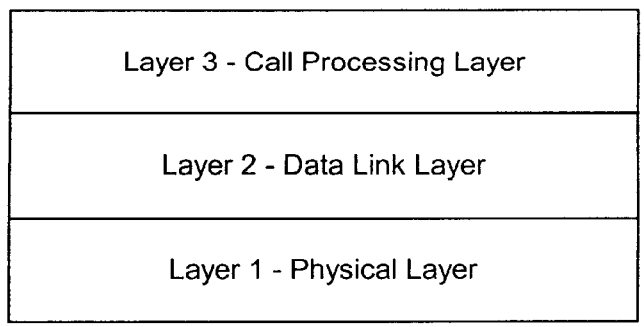
FIG. 1 is a diagram illustrating a layered communication protocol such as the IS-136 standard.
Figure 2:
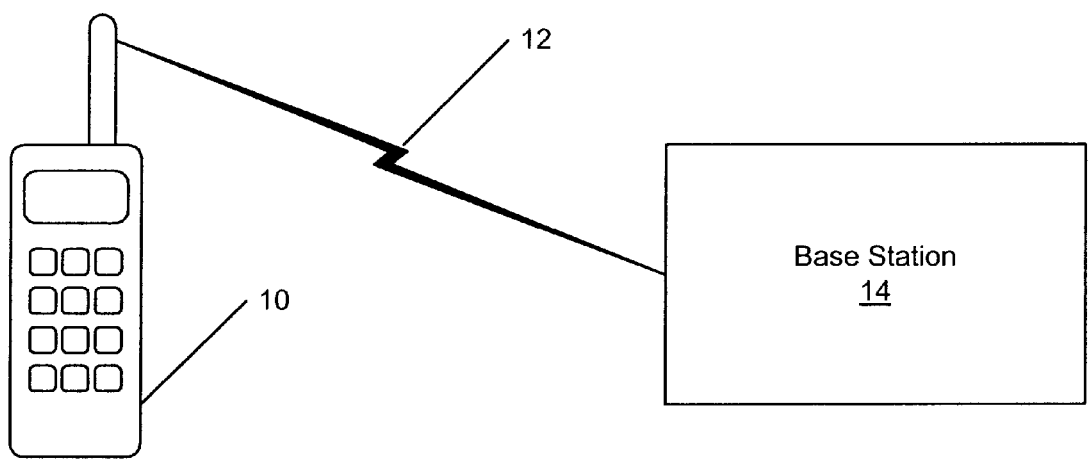
FIG. 2 is a schematic illustration of a wireless communication system utilizing the present invention.

FIG. 2 illustrates a cellular communication system which utilizes the present invention. As seen in FIG. 2 a mobile station 10, such as a radiotelephone, communicates with a base station 14 over a wireless communication link 12. The mobile station 10 may communicate with the base station 14 utilizing any number of communication protocols, however, preferably the mobile station 10 utilizes a communication protocol having messages which include mandatory elements and optional elements. For example, the IS-136 standard is such a communication protocol. However, the present invention should not be construed as limited to the IS-136 standard as the teachings of the present invention may be applicable to any communication protocol which allows for the assembly of a partial message from which operations associated with the partial message may be performed.

In general, the present invention provides for improved processing of messages from frames in lost data situations by receiving part of a message which has been transmitted over the wireless communication link 12. The receiving station then determines if sufficient information was received in the message to perform an operation specified by the message. If such is the case, the specified operation is performed by the receiving station.

In an IS-136 embodiment of the present invention, the partial message is received at Layer 2 as one or more frames. The partial message is then assembled from the frames if it is determined that the entire message is not available (e.g. a timeout or error condition has occurred). The partial message is then provided to Layer 3 which determines if sufficient information is contained in the partial message to carry out an operation specified by the partial message. If sufficient information is available, then the operation is carried out. Thus, the present invention allows for recovery of messages even though data loss conditions are present by allowing operations to occur when less than an entire message is received.

The present invention will now be described with respect to FIGS. 3 through 5 which are flowchart illustrations of an IS-136 embodiment of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 3:
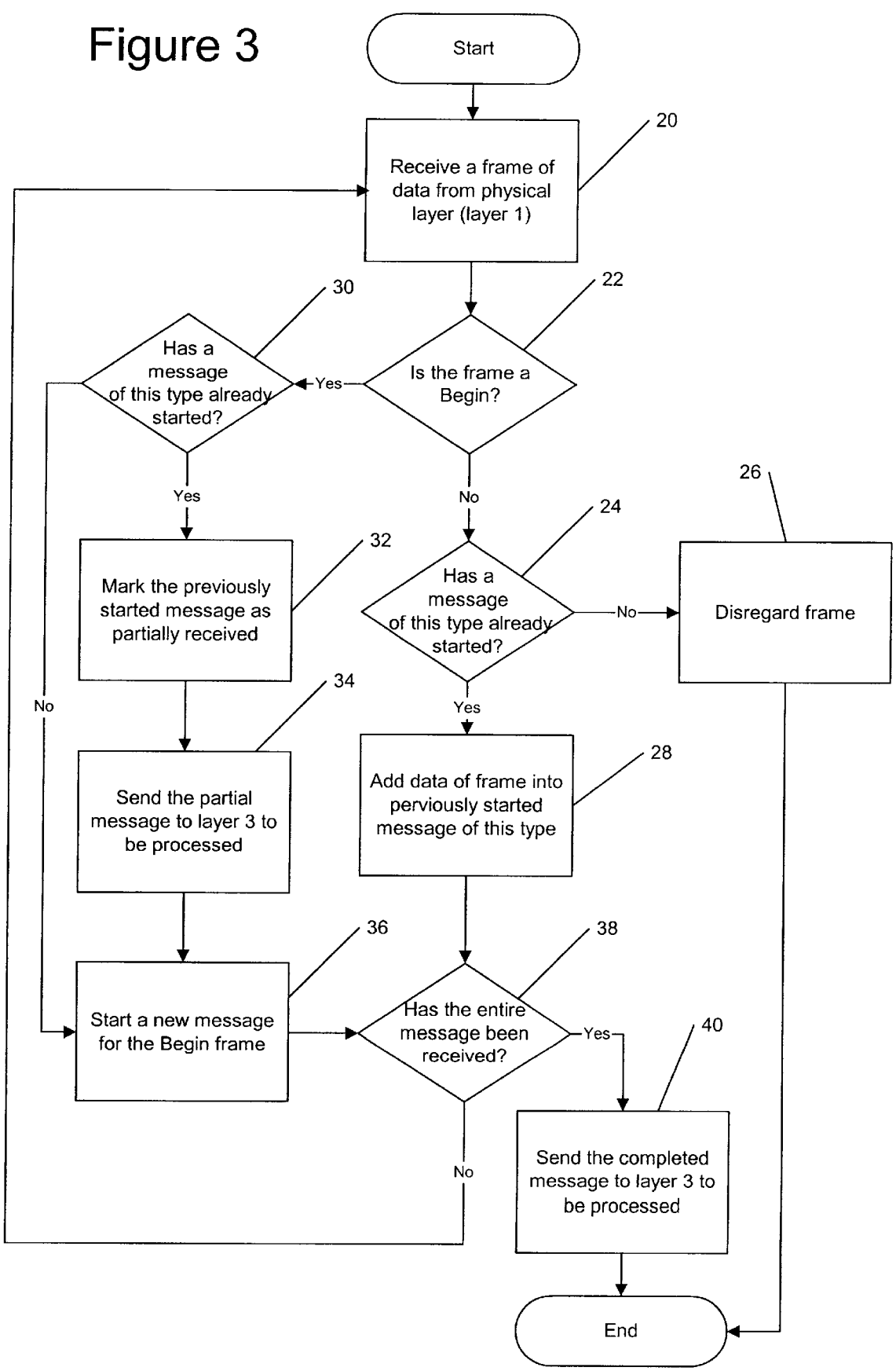
FIG. 3 is a flowchart illustrating Layer 2 operations of an IS-136 embodiment of the present invention.

Referring now to FIG. 3, the operation of IS-136 Layer 2 of a mobile station 10 or a base station 14 are illustrated. As seen in FIG. 3, a frame is received by Layer 2 from the physical layer (layer 1) (block 20). Layer 2 determines if the frame is a "Begin" frame signifying the beginning of a message (block 22). If the frame is not a Begin frame, then Layer 2 determines if a message of the type associated with the received frame has already been started (block 24). Methods for the determination of a message type and association of subsequent frames of a message with preceding frames are known to those of skill in the art and will not be described further herein.

If a message of the same type as the received frame has not already been started, then the frame is disregarded (block 26). Examples of types of messages include PCH, ARCH, and SMSCH messages. However, if a message of the same type as the received frame has already been started, then the data of the frame is added to the data from the previously started message (block 28). Methods for the assembly of a message from a frame of data are known to those of skill in the art and will not be described further herein. If the data is added to a previously started message, then Layer 2 determines if the entire message has been received (block 38). If the entire message has been received, then the completed message is sent to Layer 3 (block 40). Otherwise, Layer 2 returns to block 20 and waits for the next received frame from Layer 1.

If the frame received from Layer 1 is a Begin frame (block 22), then Layer 2 determines if a message of this type has already been started (block 30). If a message of the same type as the received Begin frame has already been started, then the previously started message is marked as a partially received message (block 32). The partially received message is then sent to Layer 3 to be processed (block 34). Layer 2 then starts the new message for the received Begin frame (block 36). Layer 2 also determines if the entire message has been received (block 38). If the entire message has been received, then the completed message is sent to Layer 3 (block 40). Otherwise, Layer 2 returns to block 20 and waits for the next received frame from Layer 1.

If a message of the same type as the received Begin frame has not already been started (Block 30), then Layer 2 starts the new message for the received Begin frame (block 36). Layer 2 then determines if the entire message has been received (block 38). If the entire message has been received, then the completed message is sent to Layer 3 (block 40). Otherwise, Layer 2 returns to block 20 and waits for the next received frame from Layer 1.

Figure 4:
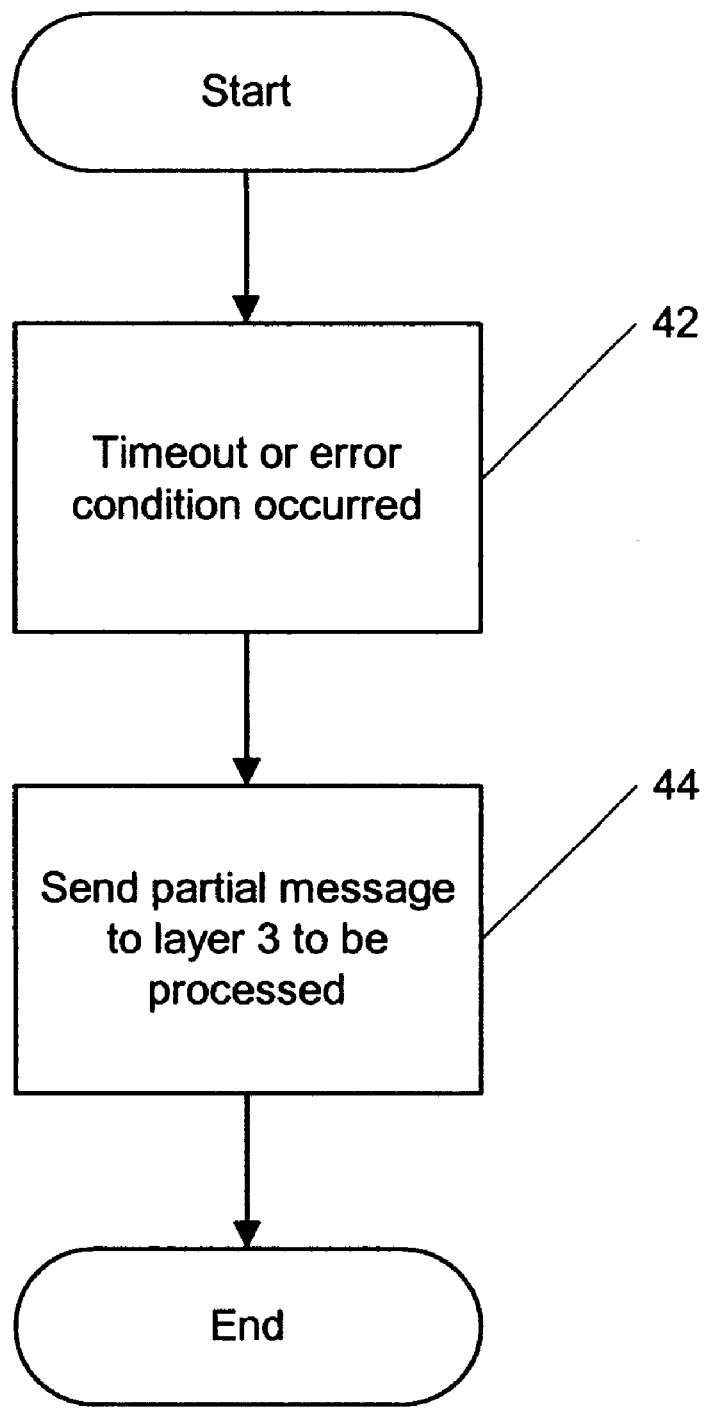
FIG. 4 is a flowchart illustrating Layer 2 error handling operations of an IS-136 embodiment of the present invention.

Additional operations of Layer 2 are illustrated in FIG. 4. FIG. 4 illustrates the timeout and error condition handling of Layer 2 according to an IS-136 embodiment of the present invention. As seen in FIG. 4, when a timeout or error condition occurs (block 42) any partial message associated with the timeout or error condition is sent to Layer 3 to be processed (block 44). A timeout occurs if a started message does not receive an expected frame within a predefined time period. An error condition relating to a started message may result from any number of errors, such as for example, a CRC error on a continue frame of a message. As will be appreciated by those of skill in the art, any number of timeout or error conditions may trigger sending a partial message from Layer 2 to Layer 3.

Figure 5:
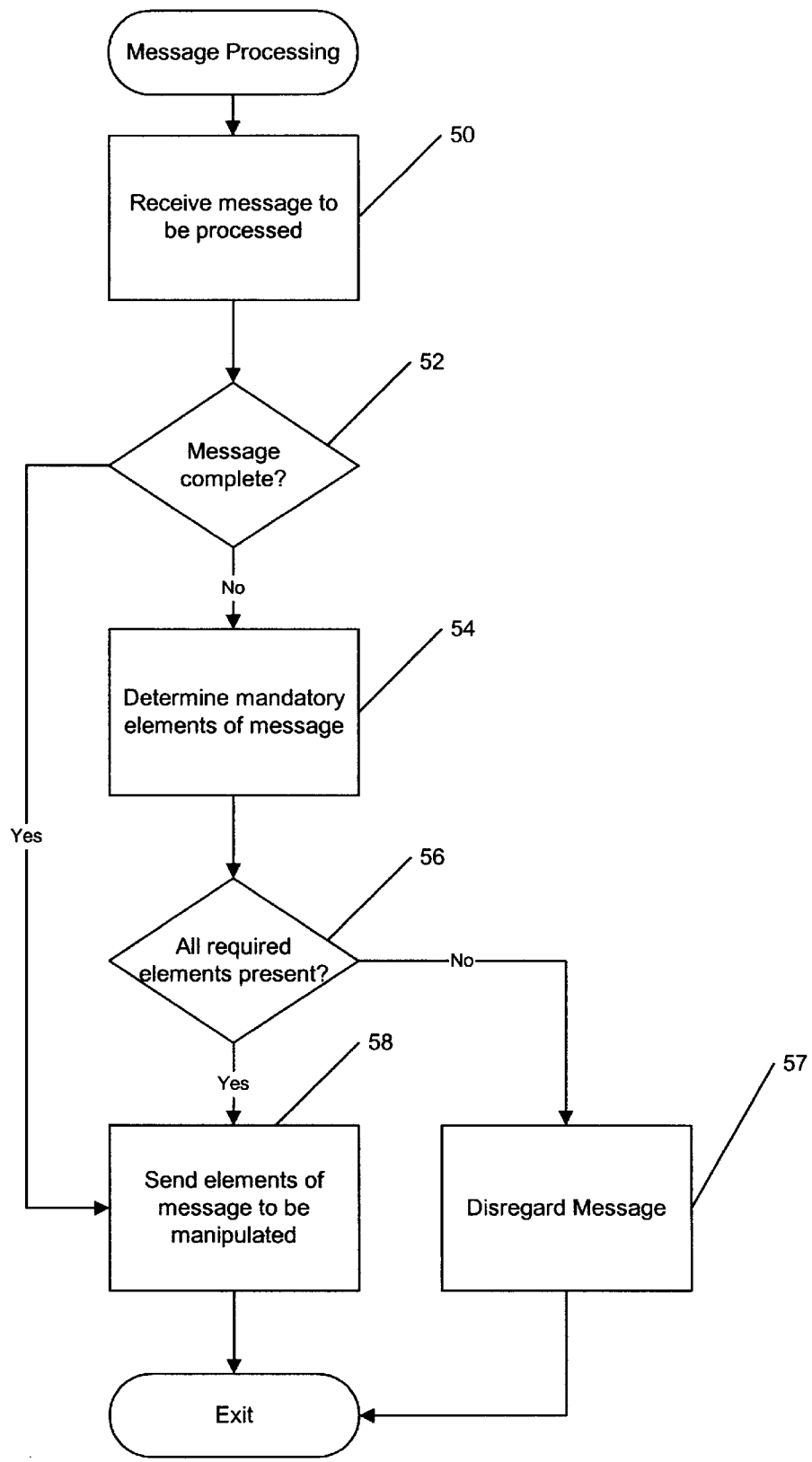
FIG. 5 is a flowchart illustrating Layer 3 operations of an IS-136 embodiment of the present invention.

FIG. 5 illustrates the operations of a message receipt process of Layer 3 when a message is received from Layer 2 in an IS-136 embodiment of the present invention. As FIG. 5 illustrates, a message is received by the message receipt process of Layer 3 from Layer 2 (block 50) and Layer 3 determines if the message is a complete message (block 52). If the message is not a complete message, then it is determined if the mandatory elements of the message are present in the message received from Layer 2 (block 54). If all of the mandatory elements of the message are not present, then the message is disregarded (block 56 and block 57). If all of the mandatory elements are present, then these elements are sent on from the message receipt process for further manipulation and action by Layer 3 (block 56 and block 58). Similarly, if the message received is a complete message (block 52) then both the mandatory and optional elements of the message are present and these elements are sent on for further processing. The further processing of the elements of the message may be carried out using conventional techniques known to those of skill in the art.

An example of the generation of a partial message is illustrated in FIGS. 6A through 6C. FIG. 6A illustrates a Single MSID PCH Frame Page received by Layer 2 with two 7 bits headers (Header A and Header B), a 1 bit Extension Header field (EHI), a 34 bit Mobile Station Identification (MSID), an 8 bit Layer 3 Length Indicator field (L3LI) and 52 bits of L3 Data. In the present example, the entirety of the frame illustrated in FIG. 6A is received by Layer 2. Based on the L3LI field equal to 8 octets, Layer 2 expects to receive a PCH Continue Frame of the form illustrated in FIG. 6B. However, that frame is never received by Layer 2.

After the error condition is detected, Layer 2 examines the frame that has been received and assembles the message illustrated in FIG. 6C. Based on the frame received, illustrated in FIG. 6A, Layer 2 has received 52 of the 64 expected bits of L3 Data. From that data, Layer 2 is able to create the message of FIG. 6C which includes 2 bits for the Protocol Discriminator field, 6 bits for the Message Type field, 4 bits for the Service Code field and 40 of the expected 52 bits of Display data. The remaining 12 bits of Display data were to be received in the PCH continue frame of FIG. 6B which was not received by Layer 2.

Despite only having received part of the message illustrated in FIG. 6C, the first 12 bits of the message are all that is mandatory for Layer 3 to act on the Page message. The optional Display data is not required and Layer 3 may act on the valid information received and ignore the optional Display data. By doing this, the Page can still be completed and all that is lost is information that would have been received in the Display data element, such as Caller ID.

In addition to the Page message described above, other examples of IS-136 messages with mandatory and optional elements include the Message Waiting message, the Parameter Update message the R-DATA message and the Release message. These as well as other messages which include both mandatory and optional elements may be recovered, utilizing the teachings of the present invention, despite less than all of the message being received.

The present invention has been described with respect to the IS-136 protocol. However, as will be appreciated by those of skill in the art, the present invention may be applicable to any communication protocol which includes mandatory and optional elements in messages. Furthermore, while the present invention has been described with respect to data loss resulting from the loss of frames, the teachings of the present invention may also be applicable to loss of data within a frame if portions of a frame may be recovered. In such a case, the present invention would determine if sufficient data is recoverable from the frame to establish the mandatory elements of the message contained in the frame.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of improving message processing in lost data circumstances for a communication system communicating over a wireless communication link, wherein the communication system operates utilizing a layered communication protocol, the method comprising the steps of:

receiving part of an entire message which has been transmitted over the wireless communication link, wherein the part of the entire message is less than the entire message, and wherein said receiving step comprises the steps of:
  receiving at a first layer of the layered communication protocol, frames of the entire message; and
  providing to a second layer of the layered communication protocol, a partial message received by the first layer if the entire message is not received by the first layer; and determining if sufficient information was received in the part of the message to perform an operation specified by the entire message; and performing the operation specified if it is determined that sufficient information was received in the part of the message to perform the operation specified by the entire message.

2. The method according to claim 1, wherein said providing step comprises the step of providing the partial message to the second layer if an error in receiving any frame of the entire message occurs or upon occurrence of a timeout condition associated with the entire message.

3. The method according to claim 1, wherein said determining step comprises the steps of:
  receiving at the second layer of the layered communication protocol the partial message received by the first layer; and
  determining if sufficient information is included in the partial message received from the first layer so as to perform an operation specified by the entire message.

4. The method according to claim 1, wherein said providing step comprises the steps of:
  assembling the partial message from the frames received by the first layer if all of the frames of an entire message are not received by the first layer; and
  providing the assembled partial message to the second layer.

5. A communication system for communicating over a wireless communication link with improved message processing in lost data circumstances, wherein the communication system operates utilizing a layered communication protocol, comprising:

means for receiving part of an entire message which has been transmitted over the wireless communication link, wherein the part of the entire message is less than the entire message, and wherein said means for receiving comprises:

means for receiving at a first layer of the layered communication protocol, frames of said message; and
  means for providing to a second layer of the layered communication protocol, said part of the entire message received by the first layer if the entire message is not received by the first layer; and means for determining if sufficient information was received in the part of the entire message to perform an operation specified by the entire message; and means for performing the operation specified if it is determined that sufficient information was received in the part of the message to perform the operation specified by the entire message.

6. The system according to claim 5, wherein said means for providing comprises means for providing the partial message to the second layer if an error in receiving any frame of the entire message occurs or upon occurrence of a timeout condition associated with the entire message.

7. The system according to claim 5, wherein said means for determining comprises:
  means for receiving at the second layer of the layered communication protocol the partial message received by the first layer; and
  means for determining if sufficient information is included in the partial message received from the first layer so as to perform an operation specified by the entire message.

8. The system according to claim 5, wherein said means for providing comprises:
  means for assembling the partial message from the frames received by the first layer if all of the frames of an entire message are not received by the first layer; and
  means for providing the assembled partial message to the second layer.

9. A computer program product for improving message processing in lost data circumstances for a communication system communicating over a wireless communication link, wherein the communication system operates utilizing a layered communication protocol, the computer program product comprising:

a computer-readable storage medium having computer-readable program code means embodied in said medium, said computer-readable program code means comprising:
  computer-readable program code means for receiving part of an entire message which has been transmitted over the wireless communication link, wherein the part of the entire message is less than the entire message, said computer-readable program code means for receiving comprising:
    computer-readable program code means for receiving at a first layer of the layered communication protocol, frames of said entire message; and
    computer-readable program code means for providing to a second layer of the layered communication protocol, the part of the entire message received by the first layer if the entire message is not received by the first layer; and
  computer-readable program code means for determining if sufficient information was received in the part of the entire message to perform an operation specified by the entire message; and
  computer-readable program code means for performing the operation specified if it is determined that sufficient information was received in the part of the message to perform the operation specified by the entire message.

10. The computer program product according to claim 9, wherein said computer-readable program code means for providing comprises computer-readable program code means for providing the partial message to the second layer if an error in receiving any frame of the entire message occurs or upon occurrence of a timeout condition associated with the entire message.

11. The computer program product according to claim 9, wherein said computer-readable program code means for determining comprises:

computer-readable program code means for receiving at the second layer of the layered communication protocol the partial message received by the first layer; and computer-readable program code means for determining if sufficient information is included in the partial message received from the first layer so as to perform an operation specified by the entire message.

12. The computer program product according to claim 9, wherein said computer-readable program code means for providing comprises:

computer-readable program code means for assembling the partial message from the frames received by the first layer if all of the frames of an entire message are not received by the first layer; and computer-readable program code means for providing the assembled partial message to the second layer.

\* \* \* \* \*